US010270327B1

(12) United States Patent
Fu et al.

(10) Patent No.: US 10,270,327 B1
(45) Date of Patent: Apr. 23, 2019

(54) VOLTAGE SENSOR-LESS POSITION DETECTION IN AN ACTIVE FRONT END

(71) Applicant: Deere & Company, Moline, IL (US)

(72) Inventors: Tianjun Fu, Fargo, ND (US); Long Wu, Fargo, ND (US); Kent Wanner, Moline, IL (US); Jason Dickherber, Moline, IL (US); Chris J. Tremel, West Fargo, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/783,057

(22) Filed: Oct. 13, 2017

(51) Int. Cl.
*H02M 1/08* (2006.01)
*H02P 27/08* (2006.01)
*H02M 7/5395* (2006.01)
*H02M 7/5387* (2007.01)

(52) U.S. Cl.
CPC ........... *H02M 1/08* (2013.01); *H02M 7/5395* (2013.01); *H02M 7/53871* (2013.01)

(58) Field of Classification Search
CPC .. H02M 1/08; H02M 7/53871; H02M 7/5395; H02M 7/53873
USPC ........................................................ 363/132
See application file for complete search history.

(56) References Cited

U.S. PATENT DOCUMENTS

| 7,940,537 | B2 * | 5/2011 | Abolhassani | H02M 7/49 363/37 |
| 8,030,791 | B2 | 10/2011 | Lang et al. | |
| 8,350,397 | B2 | 1/2013 | Lang et al. | |
| 8,395,360 | B2 | 3/2013 | Tripathi et al. | |
| 8,704,571 | B2 * | 4/2014 | Kerkman | H03L 7/00 324/76.39 |
| 9,385,638 | B2 * | 7/2016 | Simms | H02P 27/06 |
| 9,722,520 | B2 | 8/2017 | Tripathi et al. | |
| 2004/0183498 | A1 * | 9/2004 | Iwaji | H02P 21/00 318/801 |
| 2008/0007199 | A1 | 1/2008 | Kasaoka et al. | |
| 2009/0021020 | A1 * | 1/2009 | Andresen | H02P 9/305 290/55 |
| 2010/0066283 | A1 | 3/2010 | Kitanaka | |
| 2011/0133678 | A1 | 6/2011 | Tomigashi | |
| 2011/0254516 | A1 * | 10/2011 | Ren | H02P 9/007 322/99 |
| 2012/0081061 | A1 * | 4/2012 | Zargari | H02J 3/01 318/503 |

(Continued)

OTHER PUBLICATIONS

Receivd STIC search report from EIC 2800 searcher Mesfin Getaneh on Apr. 2, 2018.*

(Continued)

*Primary Examiner* — Timothy J. Dole
*Assistant Examiner* — Htet Z Kyaw
(74) *Attorney, Agent, or Firm* — Harness, Dickey & Pierce, P.L.C.

(57) ABSTRACT

A controller may include a memory having computer-readable instructions stored therein; and a processor configured to execute the computer-readable instructions to generate Pulse Width Modulation (PWM) signals to control power switches of an Active Front End (AFE) inverter based on at least a synthesized grid voltage vector angle at a terminal of an alternating current (AC) grid without using physical voltage sensors at the terminal of the AC grid, and control the AFE inverter to supply power to a load based on the PWM signals.

20 Claims, 12 Drawing Sheets

(56) References Cited

U.S. PATENT DOCUMENTS

| | | | | |
|---|---|---|---|---|
| 2012/0268081 | A1* | 10/2012 | Tripathi | F03D 7/0272 322/28 |
| 2013/0033907 | A1* | 2/2013 | Zhou | H02M 1/12 363/37 |
| 2013/0147442 | A1* | 6/2013 | Tripathi | F03D 7/0272 322/89 |
| 2013/0208519 | A1* | 8/2013 | Yamamoto | H02M 7/12 363/67 |
| 2014/0225545 | A1* | 8/2014 | Becerra | H02P 6/14 318/400.26 |
| 2014/0362617 | A1* | 12/2014 | Li | H02J 3/00 363/34 |
| 2014/0362623 | A1* | 12/2014 | Farkas | H02J 3/32 363/97 |
| 2015/0077067 | A1* | 3/2015 | Kanjiya | H02P 9/10 322/21 |
| 2015/0236632 | A1* | 8/2015 | Marohl | H02P 21/22 318/722 |
| 2015/0316906 | A1* | 11/2015 | Xia | H02J 3/1842 700/29 |
| 2016/0144871 | A1* | 5/2016 | Jalla | B60L 1/003 105/27 |
| 2016/0173012 | A1* | 6/2016 | Nondahl | H02P 6/08 318/400.34 |
| 2016/0268916 | A1* | 9/2016 | Ramsay | H02M 5/458 |
| 2016/0282392 | A1* | 9/2016 | Lee | H02P 21/36 |
| 2016/0315501 | A1* | 10/2016 | Long | H02J 3/38 |
| 2016/0329714 | A1* | 11/2016 | Li | H02M 7/44 |
| 2017/0133922 | A1* | 5/2017 | Venkataramanan | H02M 1/143 |
| 2017/0229857 | A1 | 8/2017 | Kral et al. | |
| 2017/0272023 | A1* | 9/2017 | Ahmed | H02P 27/08 |
| 2017/0366082 | A1* | 12/2017 | Liu | H02P 7/04 |
| 2018/0091075 | A1* | 3/2018 | Musil | H02P 6/28 |
| 2018/0145602 | A1* | 5/2018 | Wei | H02M 3/33507 |

OTHER PUBLICATIONS

Received STIC search report from EIC 2800 searcher Samir Patel dated Aug. 22, 2018 for claim 3.*
Received STIC search report from EIC 2800 searcher Samir Patel dated Aug. 23, 2018 for claim 5.*
Non-Final Office Action dated Oct. 18, 2018 for U.S. Appl. No. 15/915,553.
Received STIC search report from EIC 2800 searcher Benjamin Martin dated Aug. 23, 2018.
Received STIC search report from EIC 2800 searcher Mesfin Getaneh dated Jun. 21, 2018.
Extended European Search Report dated Mar. 8, 2019 for EP Application No. 18198514.4.
Yong Yang et al., "Research on Grid-Connected Inverter Based on Virtual Grid Voltage flux and PLL Without Grid Voltage Sensors", *IEEE 6th International Power Electronics and Motion Control Conference, 2009: IPEMC '09*; Wuhan, China, May 17-20, 2009, IEEE, Piscataway, NJ, USA, May 17, 2009, pp. 696-701, XP031535196, DOI: 10.1109/IPEMC.2009.5157474, ISBN: 978-1-4244-3556-2.
Bradshaw J. et al, "Bit stream implementation of a phase-locked loop", *The Institution of Engineering and Technology, JOU*, vol. 4, No. 1, Jan. 4, 2011, pp. 11-20, XP006037470, ISSN: 1755-4543, DOI: 10.1049/IET-PEL:20100009.
Jain Prashant et al., "Hybrid Phase Locked Loop for Controlling Centralized Inverters in Large Solar Photovoltaic Power Plants", *2016 IEEE International Conference on Power Electronics, Drives and Energy Systems (PEDES)*, IEEE, Dec. 14, 2016, pp. 1-7, XP033089959, DOI: 10.1109/PEDES.2016.7914349.

* cited by examiner

Fig. 11A

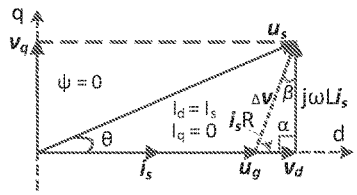 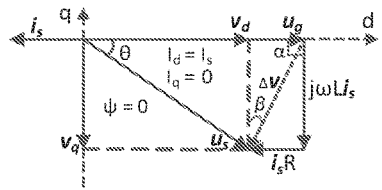

A1. $I_S > 0$ & |Power Factor| = 1  
(Supplying power)

A2. $I_S < 0$ & |Power Factor| = 1  
(Consuming power)

A. AFE inverter supplies/consumes power at unity power factor

Fig. 11B

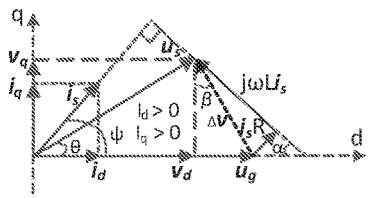 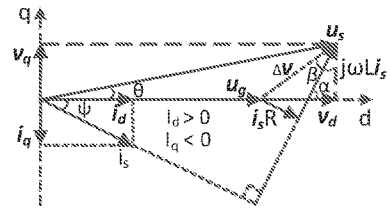

B1. $I_S > 0$ & Power Factor > 0 ($i_s$ leads $u_g$)   B2. $I_S > 0$ & Power Factor < 0 ($u_g$ leads $i_s$)

B. AFE inverter supplies power to the grid ($I_S > 0$)

Fig. 11C

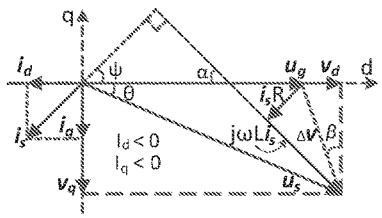 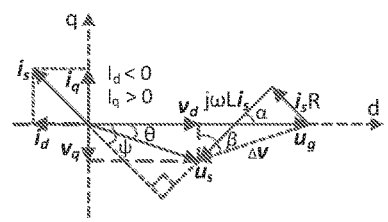

C1. $I_S < 0$ & Power Factor > 0 ($i_s$ leads $-u_g$)   C2. $I_S < 0$ & Power Factor < 0 ($-u_g$ leads $i_s$)

C. AFE inverter consumes power from the grid ($I_S < 0$)

VOLTAGE SENSOR-LESS POSITION DETECTION IN AN ACTIVE FRONT END

BACKGROUND

1. Field

Example embodiments relate generally to an apparatus configured to detect an angle of a grid voltage vector at a terminal of an alternating current (AC) grid, a system and/or a method of performing same.

2. Related Art

In an Active Front End (AFE) control system, a phase locked loop (PLL) based control method is often used to detect an angle of a grid voltage vector at a terminal of an alternating current (AC) based on grid line-to-line voltage information. Conventionally, in order to detect the angle of the grid voltage vector of the AC grid, the grid line-to-line voltage information may need to be sensed first using external voltage sensors attached to terminals of the AC grid.

SUMMARY

Some example embodiments relate to a controller and/or a method of generating Pulse Width Modulation (PWM) signals for power switches of an Active Front End (AFE) inverter.

In some example embodiments, the controller may include a memory having computer-readable instructions stored therein; and a processor configured to execute the computer-readable instructions to, generate Pulse Width Modulation (PWM) signals to control power switches of an Active Front End (AFE) inverter based on at least a synthesized grid voltage vector angle at a terminal of an alternating current (AC) grid without using physical voltage sensors at the terminal of the AC grid, and control the AFE inverter to supply power to a load based on the PWM signals.

BRIEF DESCRIPTION OF THE DRAWINGS

At least some example embodiments will become more fully understood from the detailed description provided below and the accompanying drawings, wherein like elements are represented by like reference numerals, which are given by way of illustration only and thus are not limiting of example embodiments and wherein:

FIGS. 11A to 11C are vector diagrams illustrating current and voltage vectors in a direct-quadrature (dq) rotating reference frame according to some example embodiments.

DETAILED DESCRIPTION

Figure 1:
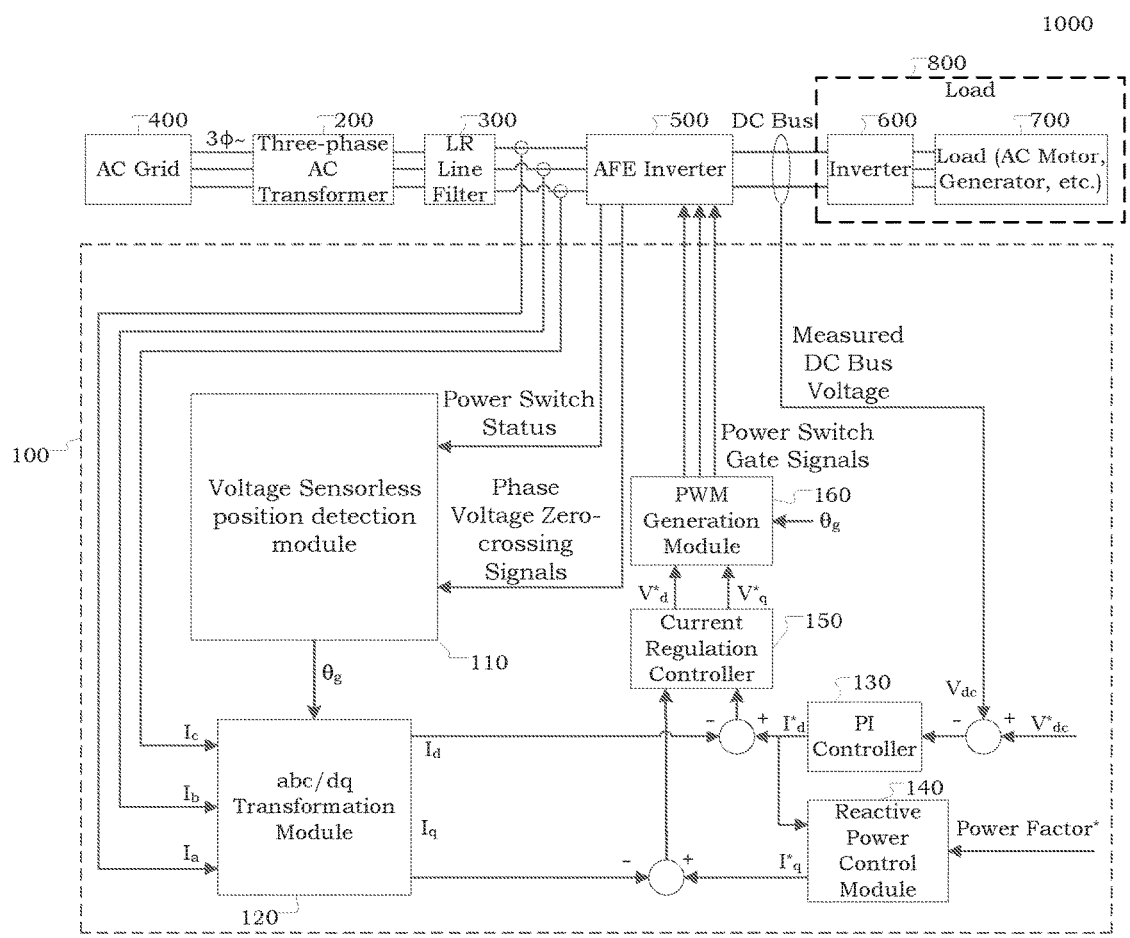
FIG. 1 is a block diagram of a system for controlling a load according to some example embodiments.

Some example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores the code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The transmission medium may be twisted wire pairs, coaxial cable, optical fiber, or some other suitable transmission medium known to the art.

The example embodiments may have different forms and/or be combined, and should not be construed as being limited to the descriptions set forth herein.

In one or more example embodiments, a data processing system may estimate the grid input line-to-line voltage information directly from the AFE inverter terminals during an inverter self-sensing mode by estimating the inverter terminal voltage (e.g., voltage drops across the inverter switches and diodes) based on inverter gate drive signals, and subsequently estimating the angle of the composite voltage vector, which is constructed from the three-phase inverter terminal voltages, using the PLL based position detection method.

To precisely control the AFE system power factor at a grid input voltage terminal, the data processing system may compensate for a voltage drop across the impedance between the grid input voltage terminal and the AFE inverter terminals by converting the estimated inverter voltage vector angle from the inverter terminal voltages to the grid voltage vector angle corresponding to the voltage at the grid input terminals.

Figure 2:
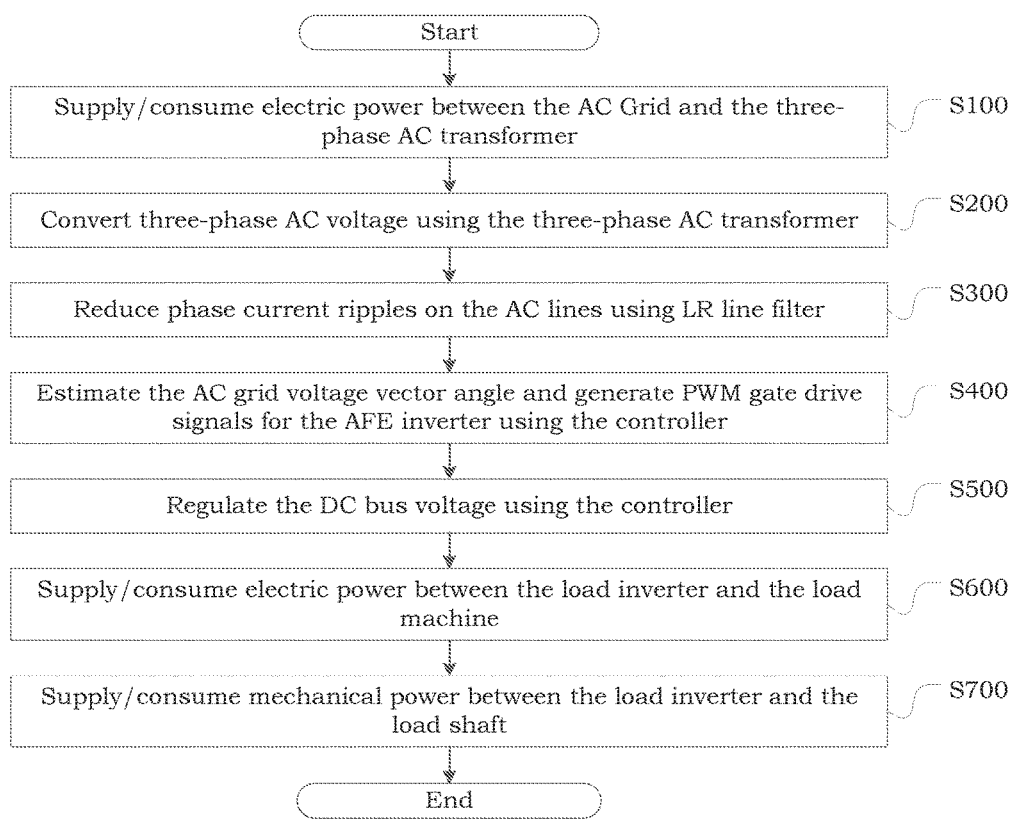
FIG. 2 illustrates a method of controlling a system based on voltage sensorless position detecting according to some example embodiments.

FIG. 1 is a block diagram of a system for controlling a load according to some example embodiments, and FIG. 2 illustrates a method of controlling the system according to some example embodiments.

Referring to FIGS. 1 and 2, a system 1000 may include a data processing system 100, such as a controller, an alternating current (AC) transformer 200 and an inductor resistor (LR) line filter 300 connected to an alternating current (AC) power grid 400, an active front end (AFE) inverter 500, and an AFE load 800. In some example embodiments, the AFE load 800 may include an inverter 600, and a load 700, such as an interior permanent magnet (IPM) motor.

The data processing system 100 may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner. In an example embodiment, the data processing system 100 may include a processor and a memory to support storing, processing and execution of software instructions of one or more software modules.

As discussed below, the data processing system 100 may control the AFE inverter 500 based on signals received from the AFE inverter 500.

In some example embodiments, the processor of the data processing system 100 may generate Pulse Width Modulation (PWM) signals to control power switches of an Active Front End (AFE) inverter based on at least a synthesized grid voltage vector angle at a terminal of an alternating current (AC) grid without using physical voltage sensors at the terminal of the AC grid, and control the AFE inverter to supply power to a load based on the PWM signals.

In some example embodiments, the processor may generate the PWM signals by, estimating the synthesized grid voltage vector angle at the terminal of the AC grid without using the physical voltage sensors.

In some example embodiments, the processor is configured to generate the PWM signals by, converting measured current from a measured 3-phase current in a stationary reference frame to a measured direct-quadrature (dq)-axis current in a dq rotating reference frame, generating a q-axis current reference based on a AC grid terminal reference power factor, generating a d-axis current reference based on an actual DC bus voltage and a reference DC bus voltage, the actual DC bus voltage being connected to a load, the d-axis current reference and the q-axis current reference forming a dq-axis current reference, generating dq-axis reference voltages based on the measured dq-axis current in the dq rotating reference frame and the dq-axis current reference, and generating 3-phase gate driving signals for the AFE inverter by converting the dq-axis reference voltages based on the synthesized grid voltage vector angle, the 3-phase gate driving signals being the PWM signals.

In some example embodiments, the processor is configured to generate the PWM signals such that the AFE inverter maintains an actual DC bus voltage connected to the load.

In some example embodiments, the processor is configured to estimate the synthesized grid voltage vector angle by, estimating a terminal voltage of the AFE inverter when the inverter is enabled, the terminal voltage of the AFE inverter being a voltage of a terminal of the AFE inverter, estimating a first AFE inverter terminal voltage vector angle when the AFE inverter is disabled, the first AFE inverter terminal voltage vector angle being an angle associated with a voltage vector of the terminal of the AFE inverter at an initial time, determining a second AFE inverter terminal voltage vector angle when the AFE inverter is enabled, the second AFE inverter terminal voltage vector angle being an angle associated with a voltage vector of the terminal of the AFE inverter at a second time subsequent to the initial time, and estimating the synthesized grid voltage vector angle based on the second AFE inverter terminal voltage vector angle, the synthesized grid voltage vector angle being an angle associated with a voltage vector of the terminal of the AC grid.

In some example embodiments, if the inverter is enabled, the processor is configured to estimate the terminal voltage of the AFE inverter by, estimating 3-phase line-to-neutral voltages of the terminal of the AFE inverter based on status signals associated with power switches of the AFE inverter and corresponding voltage drops across the power switches.

In some example embodiments, the processor is configured to estimate the 3-phase line-to-neutral voltages by, examining collector-emitter voltages associated with each of the power switches of the AFE inverter.

In some example embodiments, if the inverter is disabled, the processor is configured to estimate the first AFE inverter terminal voltage vector angle by, detecting zero-crossing instants when the voltage of the terminal of the AFE inverter crosses zero, calculating a AFE inverter terminal voltage vector angular frequency based on the zero-crossing instants, the AFE inverter terminal voltage vector angular frequency being an angular frequency in rad/sec of the voltage of the terminal of the AFE inverter, and calculating the first AFE inverter terminal voltage vector angle based on the AFE inverter terminal voltage vector angular frequency and a position of an AFE inverter terminal voltage vector corresponding to a most recent one of the zero-crossing instants.

In some example embodiments, the processor is configured to estimate the second AFE inverter terminal voltage vector angle by, initializing a phase locking loop (PLL) using the first AFE inverter terminal voltage vector angle when the inverter is disabled, and running the phase locking loop (PLL) using 3-phase line-to-neutral voltages of the terminal of the AFE inverter when the inverter is enabled.

In some example embodiments, the processor is configured to estimate the second AFE inverter terminal voltage vector angle by running the PLL to align the second AFE inverter terminal voltage vector angle with a d-axis of a dq rotating reference frame.

In some example embodiments, when the AFE inverter is enabled, the processor is configured to estimate the second AFE inverter terminal voltage vector angle by running the PLL to continually, calculate a position error between the second AFE inverter terminal voltage vector angle and the d-axis, calculate an angular frequency of the second AFE inverter terminal voltage vector angle by using a PI controller to regulate the position error, and calculate the second AFE inverter terminal voltage vector angle by integrating the angular frequency.

In some example embodiments, the processor is configured to estimate the AC grid voltage vector angle by compensating for a phase shift due to a voltage drop across a filter between the terminal of the AFE inverter and the terminal of the AC grid.

In some example embodiments, the filter is one of a LCL line filter and a LR line filter.

In some example embodiments, the processor is configured to convert the measured current from the measured 3-phase current to the measured dq-axis current based on the synthesized grid voltage vector angle.

In some example embodiments, the processor is configured to generate the d-axis current reference by, comparing the actual dc bus voltage and the reference DC bus voltage, and generating the d-axis current reference using a PI controller.

In some example embodiments, the processor is configured to generate the q-axis current reference based on the AC grid terminal reference power factor and the d-axis current reference.

In some example embodiments, the processor is configured to generate the dq-axis reference voltages by, generating a comparison signal based on a result of comparing the d-axis current reference and the q-axis current reference with a d-axis value of the measured dq-axis current and a q-axis value of the measured dq-axis current, respectively, and generating dq-axis reference voltages based on the comparison signal.

In some example embodiments, the processor is configured to, refine the synthesized grid voltage vector angle by compensating for a time delay associated with digital processing to generate a refined synthesized grid voltage vector angle; and generate the 3-phase gate driving signals for the AFE inverter based on the dq-axis reference voltages and the refined synthesized grid voltage vector angle, wherein the 3-phase gate driving signals are transmitted to the AFE inverter to switch a plurality of half bridges included in the power switches of the AFE inverter.

The data processing system 100 may include a voltage sensorless position detecting module 110, an abc/dq Transformation Module 120, a PI controller 130, a reactive power control module 140, a current regulation controller 150, and a PWM generation module 160. The voltage sensorless position detecting module 110 is shown in greater detail in FIG. 4.

As discussed below, the data processing system 100 may estimate a grid voltage vector angle $\theta_g$ without using physical voltage sensors attached to terminals of the AC grid 400, generate Pulse Width Modulation (PWM) signals to control power switches of the AFE inverter 500 based on the estimated grid voltage vector angle $\theta_g$, and operate the load 800 based on the PWM signals.

Referring to FIG. 2, in operation S100, the AC grid 400 may supply or consume AC power to maintain a stable DC bus voltage $V_{dc}$ at a DC bus. The DC bus electrically connects the AFE inverter 500 and the load inverter 600. The DC bus may be modeled as a capacitor that consumes the electrical power from the AC grid 400 and supplies the electrical power to the load 800. For example, the AC grid 400 may supply power to the AFE inverter 500 when the DC bus voltage $V_{dc}$ is less than the reference DC bus voltage $V_{dc}^*$, due to the load 700 drawing more power from the DC bus than the AFE inverter 500 can supply. The AC grid 400 also may consume the AC power when the DC bus voltage $V_{dc}$ is greater than the reference DC bus voltage $V_{dc}^*$ due to the load 700, which is running as a generator, supplying more power to the DC bus.

In operation S200, the three-phase AC transformer 200 may convert between high and low three-phase AC voltage.

In operation S300, the LR line filter 300 may filter out the current harmonics on lines. For example, the LR line filter 300 may be a pre-designed LR filter. The LR line filter 300 may be embodied as long cables connected between the AFE inverter 500 and the three-phase AC transformer 200, the length of which is determined based on the current harmonics on the lines.

In other example embodiments, the system 1000 may include a inductor-capacitor-inductor style filter or LCL filter (not shown) between the AFE inverter 500 and the three-phase AC transformer 200 rather than the LR filter 300, such that the data processing system 100 is configured to compensate for a phase shift due to a voltage drop across the LCL filter (not shown).

In operation S400, the data processing system 100 may estimate the grid voltage vector angle $\theta_g$, generate the Pulse Width Modulation (PWM) signals to control power switches of the AFE inverter 500 based on the estimated grid voltage vector angle $\theta_g$. Operation S400 is discussed in greater detail below with reference to the sub-operations illustrated in FIG. 4.

For example, the voltage sensorless position detecting module 110 may estimate the grid voltage vector angle $\theta_g$ defined as the d-axis orientation of the rotating dq-axis frame without using physical voltage sensors attached to the AC grid terminals 400. Thereafter, the data processing system 100 may generate the Pulse Width Modulation (PWM) signals to control the power switches of the AFE inverter 500 based on the estimated grid voltage vector angle $\theta_g$.

Details on the operation of the data processing system 100 including the estimation of the grid voltage vector angle $\theta_g$ by the voltage sensorless position detecting module 110, and the generation of the PWM signals based thereon will be discussed below with reference to FIGS. 3 to 11.

In operation S500, the AFE inverter 500 may supply/consume power to/from the AC grid 400 to regulate the DC bus voltage. For example, the AFE inverter 500 may consume power from the AC grid 400 when the DC bus voltage is less than the reference DC bus voltage $V_{dc}^*$. Alternatively, the AFE inverter 500 may supply power back to the AC grid 400 when the DC bus voltage is greater than the reference DC bus voltage $V_{dc}^*$.

The AFE inverter 500 may include power electronics, such as switching semiconductors to generate, modify and/or control the PWM signals or other alternating current signals (e.g., pulse, square wave, sinusoidal, or other waveforms) applied to the DC bus to operate the load 800.

In operation S600, the inverter 600 may supply/consume electric power to/from the load 700. For example, the inverter 600 may supply the electric power to the load 700. In this case, the inverter 600 draws power from the DC bus. Alternatively, the inverter 600 may also consume mechanical power from the load 700, when the load 700 is running as a generator. In this case, the inverter 600 supplies electric power to the DC bus.

The inverter 600 may include power electronics, such as switching semiconductors to generate, modify and control pulse-width modulated signals or other alternating current signals (e.g., pulse, square wave, sinusoidal, or other waveforms) applied to the load 700. A separate PWM generation module provides inputs to a driver stage within the inverter 600. An output stage of the inverter 600 provides the pulse-width modulated voltage waveform or other voltage signal to control the load 700. In an example embodiment, the inverter 600 is powered by the direct current (dc) voltage bus voltage $V_{dc}$.

In operation S700, the load 700 may consume power from the inverter 600. In this case, the inverter 600 consumes power from the DC bus. Alternatively, the load 700 may also supply power to the inverter 600 and the inverter 600 may supply the power back to the DC bus, when the load 700 runs as a generator.

Figure 3:
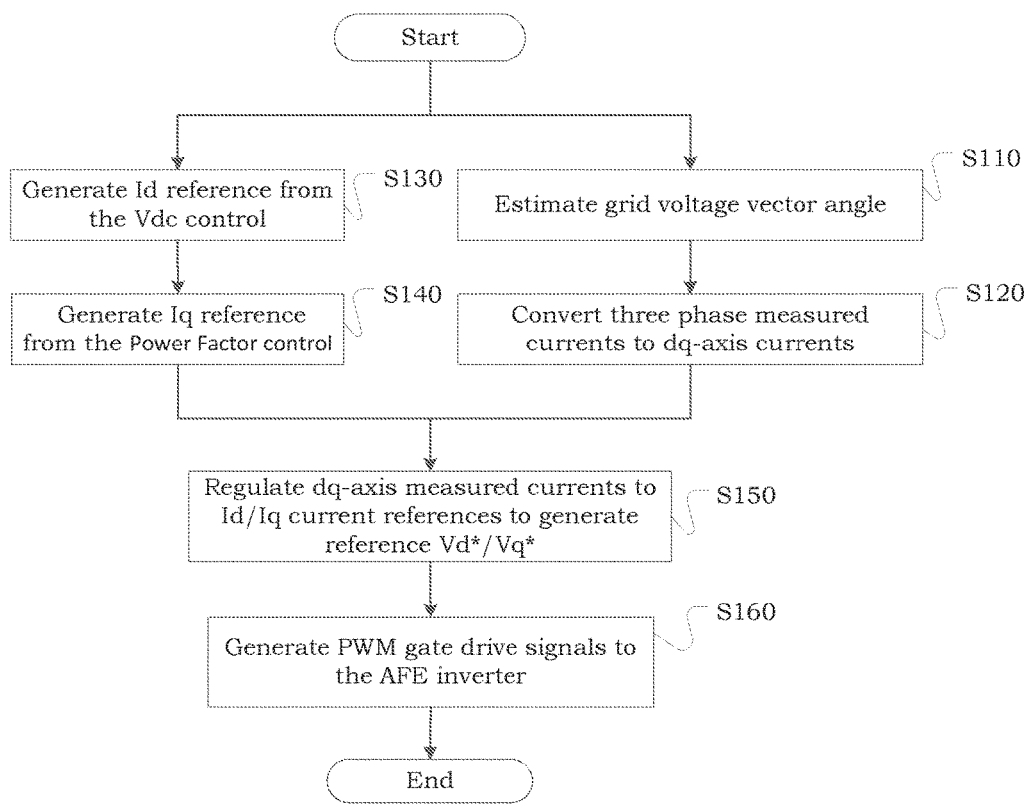
FIG. 3 illustrates a method of operating a controller to perform a voltage sensorless position detecting in a system according to some example embodiments.

FIG. 3 illustrates a method of operating a controller to perform a voltage sensorless position detecting in a system according to some example embodiments.

Referring to FIGS. 1 to 3, in operation S400 illustrated in FIG. 2, the data processing system 100 may estimate the grid voltage vector angle $\theta_g$, and generate the Pulse Width Modulation (PWM) signals to control the power switches of the AFE inverter 500 based on the estimated grid voltage vector angle $\theta_g$ by performing operations S110 to S160, discussed below.

In operation S110, the voltage sensorless position detecting module 110 may receive the power switch status information from the AFE inverter 500 when inverter switching is enabled, receive the detected phase voltage zero-crossing signals from the AFE inverter 500 when the inverter switching is disabled, and estimate the grid voltage vector angle $\theta_g$ defined as the d-axis orientation of the rotating dq-axis based thereon without using physical voltage sensors attached to the AC grid terminals 400. Therefore, the bulky and costly external voltage sensors can be removed from the AFE control system. Operation S110 will be discussed in more detail below with reference to FIGS. 4 to 11.

In operation S120, the abc/dq Transformation Module 120 may receive the 3-phase grid currents $I_c$, $I_b$, $I_a$ and perform the Clarke/Park transformation (abc-to-dq) based on the estimated grid voltage vector angle $\theta_g$ to convert the 3-phase grid currents into the q-axis current $I_q$ and the d-axis current $I_d$ in the dq rotating reference frame.

The dq axis current may refer to the direct axis current and the quadrature axis current in the dq rotating reference frame as applicable in the context of vector-controlled alternating current machines, such as the load 700.

The abc/dq Transformation Module 120 may apply a Clarke transformation and a Park transformation or other conversion equations (e.g., certain conversion equations that are suitable and are known to those of ordinary skill in the art) to convert the measured three-phase representations of current into two-phase representations of current based on the current data $I_a$, $I_b$, and $I_c$ and the estimated grid voltage vector angle $\theta_g$.

In operation S130, the PI controller 130 may receive a difference between the measured DC bus voltage $V_{dc}$ and a reference DC bus voltage $V_{dc}^*$, and may generate the d-axis reference current $I^*_d$ based on the difference between the detected DC bus voltage $V_{dc}$ and the reference DC bus voltage $V_{dc}^*$. The PI controller is a closed loop proportional-integral controller used for the measured DC bus voltage $V_{dc}$ to track the reference DC bus voltage $V_{dc}^*$.

In operation S140, the reactive power control module 140 may generate the q-axis reference current $I^*_q$ based on a reference power factor PF* received from a high-level system control unit (not shown). The reference power factor PF* may be empirically determined for the system 1000 based on users' system control requirements. The q-axis reference current $I^*_q$ is generated to assure the system 1000 is satisfying the requirement on the reference power factor PF* with the determined d-axis reference current $I^*_d$ from the operation S140.

In operation S150, the current regulation controller 150 may utilize the d-axis reference current $I^*_d$ and the q-axis reference current $I^*_q$ as reference currents to generate the dq axis reference voltage $V^*_d$ and $V^*_q$. For example, the current regulation controller 150 may receive the difference between $I_q$ and $I^*_q$, and the difference between $I_d$ and $I^*_d$, and may generate dq axis reference voltage $V^*_d$ and $V^*_q$ therefrom. The current regulation controller 150 may include two closed loop PI controllers along with a dq-axis cross-coupling decoupling module to track the d-axis current $I_d$ and the q-axis current $I_q$ to their respective references $I_d^*$ and $I_q^*$. The outputs from the d-axis current regulator and q-axis current regulator are the d-axis reference voltage $V^*_d$ and q-axis reference voltage $V^*_q$.

In operation S160, the PWM generation module 160, may receive the dq axis reference voltage $V^*_d$ and $V^*_q$ in the dq rotating reference frame from the current regulation controller 150, and convert dq axis reference voltage $V^*_d$ and $V^*_q$ in the dq rotating reference frame to an α-axis voltage command $v_\alpha^*$ and a β-axis voltage command $v_\beta^*$ in the α-β stationary frame based on the estimated grid voltage vector angle $\theta_g$, and then convert the a-axis voltage command $v_\alpha^*$ and β-axis voltage command $v_\beta^*$ from two phase data representations into three-phase data representations (e.g., three-phase representations, such as PWM duty A, duty B and duty C for three phases). The PWM generation module 160 may generate the three phase power switch gate signals for the gate drive control of the inverter power switches of the AFE inverter 500 based on the three-phase PWM duty representations.

In other example embodiments, the PWM generation module 160 may further process the estimated grid voltage vector angle $\theta_g$ to generate a refined estimated grid voltage vector angle $\theta_g'$ by extrapolating the estimated grid voltage vector angle $\theta_g$ by one and half control periods using the PLL generated frequency to compensate for a delay associated with the digital processing. Thereafter, the PWM generation module 160 may use the refined estimated grid voltage vector angle $\theta_g'$ to convert the dq axis reference voltage $V^*_d$ and $V^*_q$ to the α-β voltage commands $v_\alpha^*$ and $v_\beta^*$ in the α-β reference frame.

Figure 4:
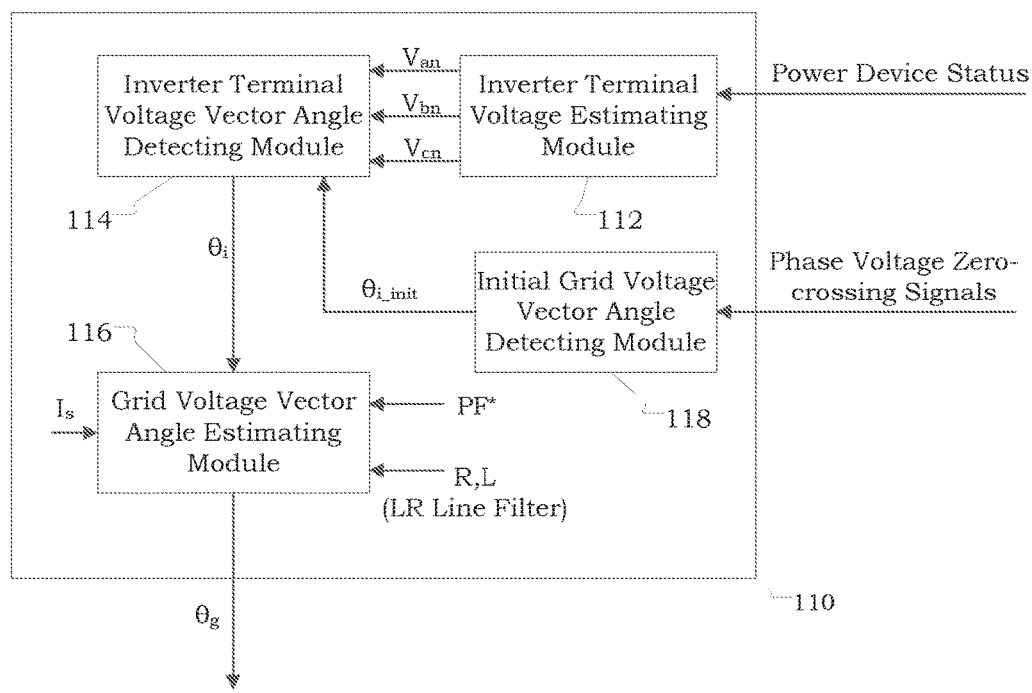
FIG. 4 illustrates a voltage sensorless position detecting module according to some example embodiments.
Figure 5:
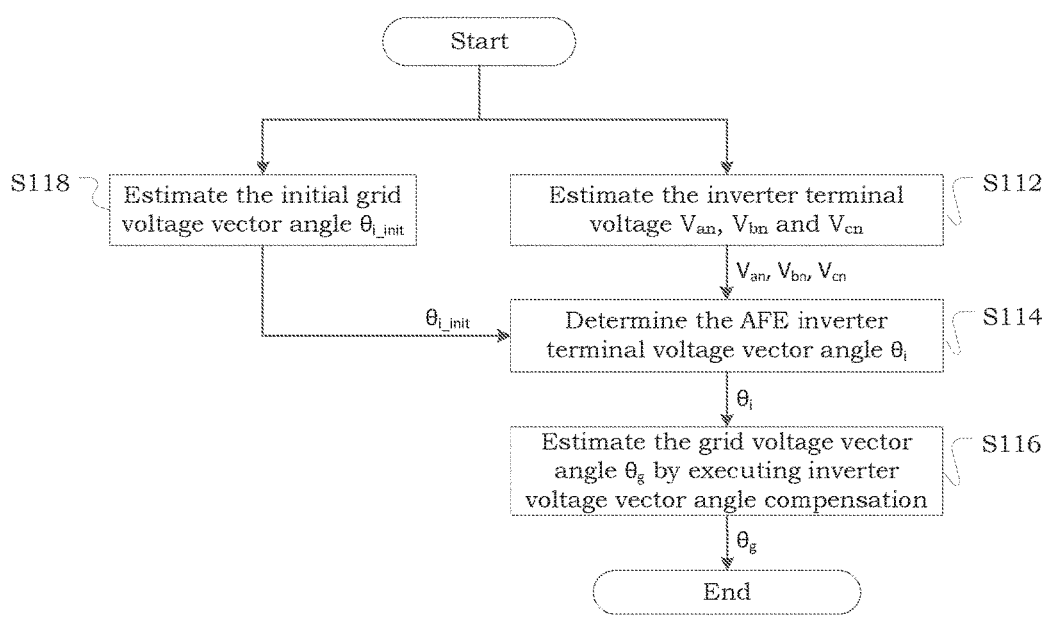
FIG. 5 illustrates a method of operating a voltage sensorless position detecting module according to some example embodiments.

FIG. 4 illustrates a voltage sensorless position detecting module according to some example embodiments, and FIG. 5 illustrates a method of operating a voltage sensorless position detecting module according to some example embodiments.

Referring to FIGS. 4 and 5, the voltage sensorless position detecting module 110 may include an inverter terminal voltage estimating module 112, an inverter terminal voltage vector angle detecting module 114, a grid voltage vector angle estimating module 116, and an initial grid voltage vector angle detecting module 118.

In operation S110 illustrated in FIG. 3, the voltage sensorless position detecting module 110 of the data processing system 100 may estimate the grid voltage vector angle $\theta_g$, by performing operations S112 to S118 illustrated in FIG. 5, discussed below.

In operation S112, the inverter terminal voltage estimating module 112 may estimate the inverter terminal voltages Van, Vbn and Vcn based on the power switch status information (or, alternatively, ON/OFF status signals) and a diode voltage drop across the power switches from the AFE inverter 500. Operation S112 will be discussed below in more detail with reference to FIG. 6.

In operation S114, the inverter terminal voltage vector angle detecting module 114 may generate the inverter terminal voltage vector angle $\theta_i$ based on the inverter terminal voltages Van, Vbn and Vcn received from the inverter terminal voltage estimating module 112 and the initial inverter terminal voltage vector angle $\theta_{i\_init}$. The inverter terminal voltage vector angle detecting module 114 may include a Proportional and Integration (PI) controller (see FIG. 7) to regulate the position error to force the q-axis voltage $V_q$ in the dq rotating reference frame to 0 such that the output of the PI controller will be the inverter terminal voltage vector angular frequency ω. Operation S114 will be discussed below in more detail with reference to FIGS. 7 and 8.

In operation S116, the grid voltage vector angle estimating module 116 may estimate the grid voltage vector angle $\theta_g$ without using physical voltage sensors based on the inverter terminal voltage vector angle $\theta_i$ received from the inverter terminal voltage vector angle detecting module 114. Operation S116 will be discussed below in more detail with reference to FIG. 9.

As discussed above, the grid voltage vector angle estimating module 116 may provide the estimated grid voltage vector angle $\theta_g$ to the abc/dq Transformation Module 120, and the abc/dq Transformation Module 120 may use the estimated grid voltage vector angle $\theta_g$ to perform abc-to-dq transformation on the 3-phase grid currents $I_a$, $I_b$ and $I_c$ to convert the 3-phase grid currents $I_a$, $I_b$ and $I_c$ into the q-axis current $I_q$ and the d-axis current $I_d$ in the dq rotating reference frame.

In operation S118, the initial grid voltage vector angle detecting module 118 may receive phase voltage zero-crossing signals from the AFE inverter 500, and may generate an initial inverter voltage vector angle $\theta_{i\_init}$ to initialize the Phase Locked Loop (PLL) controller in the inverter terminal voltage phase angle detecting module 114. Therefore, the PLL controller may start with the correct initial inverter terminal voltage vector angle $\theta_{i\_init}$. In the inverter terminal voltage vector angle detecting module 114, the PLL controller is utilized to detect the inverter terminal voltage vector angle $\theta_i$. Operation S118 will be discussed below in more detail with reference to FIG. 10.

Figure 6:
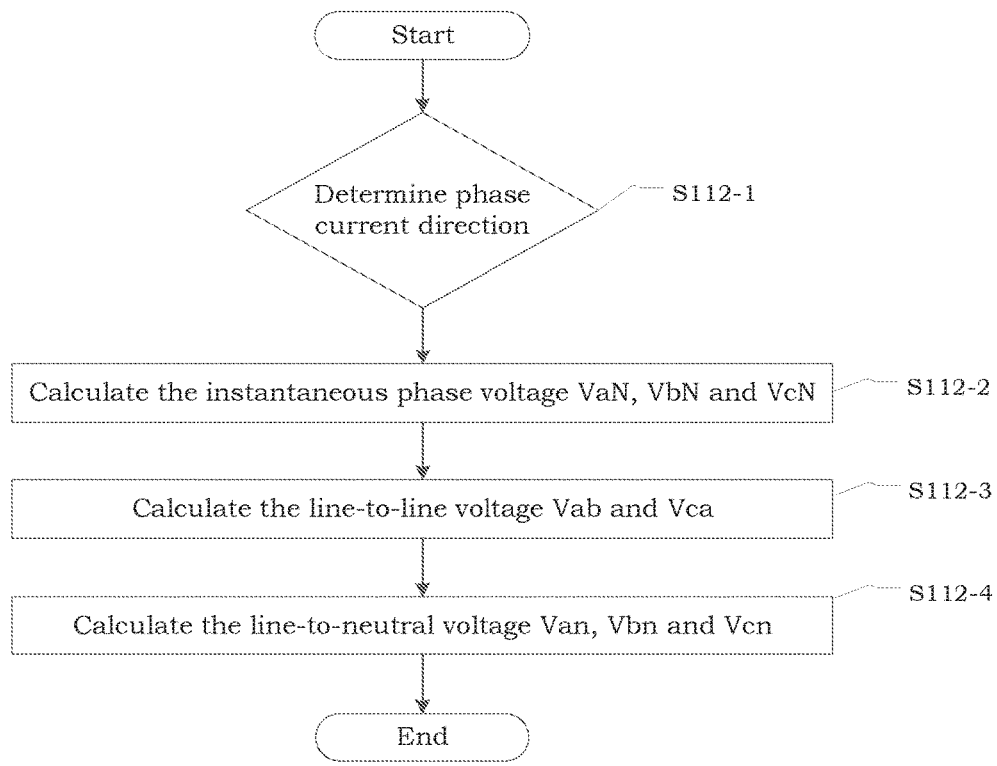
FIG. 6 illustrates a method of estimating the inverter terminal voltage according to some example embodiments.
Figure 12:
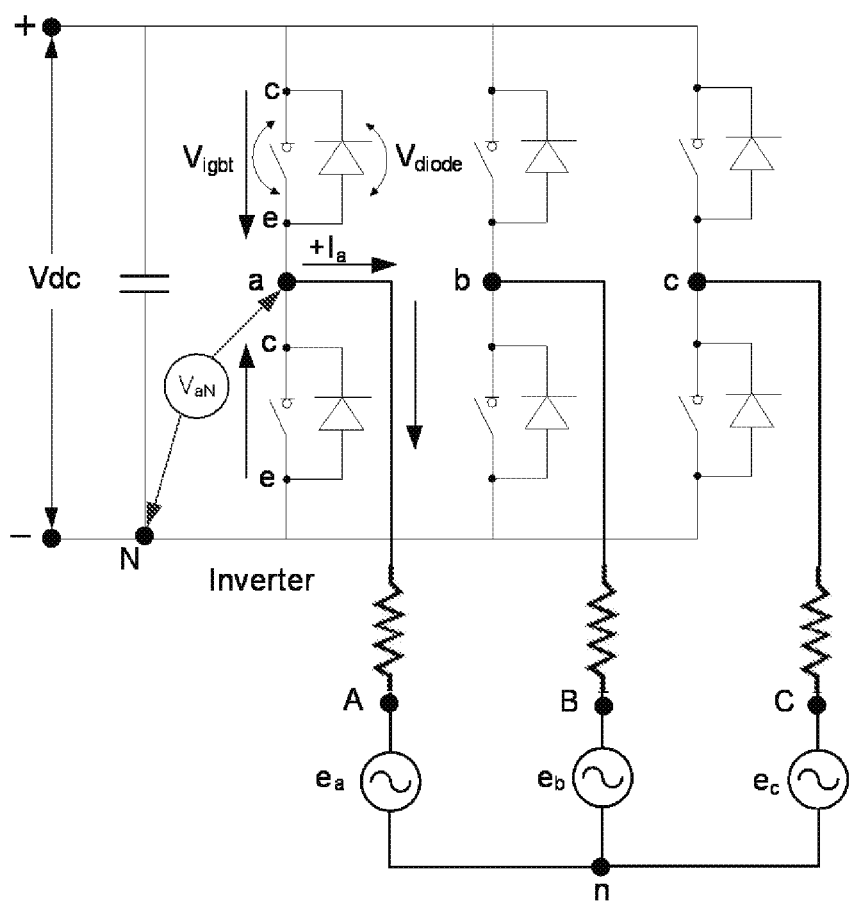
FIG. 12 is a circuit diagram illustrating an AFE inverter connected to a load according to some example embodiments.

FIG. 6 illustrates a method of estimating the inverter terminal voltage according to some example embodiments, and FIG. 12 is a circuit diagram illustrating an AFE inverter connected to a load according to some example embodiments.

Referring to FIGS. 1 to 6 and 12, in operation S112-1, the inverter termination voltage estimating module 112 may determine the phase current direction based on the power switch status information. For an example, the direction of the phase A current is defined as positive direction (+Ia) when the phase A top switch (see FIG. 12) is ON.

In operation S112-2, the inverter termination voltage estimating module 112 may calculate the instantaneous phase voltage $V_{aN}$, $V_{bN}$ and $V_{cN}$ using the following equations.

If the phase current $I_x$ (subscript 'X' represents phase a, b or c) is positive (the case illustrated in FIG. 12), the following instantaneous $V_{XN}$ (subscript 'X' represents phase a, b or c) values can be calculated:

$$V_{XN}=(Vdc-V_{igbt})=\text{Top switch ON}$$

OR $$V_{XN}=(-V_{diode})=\text{Top switch OFF} \qquad \text{Eq. 1}$$

If phase current $I_x$ is negative, the following instantaneous $V_{XN}$ values can be calculated:

$$V_{XN}=(Vdc+V_{igbt})=\text{Bottom switch OFF}$$

OR $$V_{XN}=(+V_{diode})=\text{Bottom switch ON} \qquad \text{Eq. 2}$$

In operation S112-3, the inverter termination voltage estimating module 112 may calculate the line-to-line voltage $V_{ab}$ between terminal a and terminal b of the AFE inverter 500 and $V_{ca}$ between terminal c and terminal a of the AFE inverter 500 using the following equations:

$$V_{ab}=V_{aN}-V_{bN}$$

$$V_{ca}=V_{cN}-V_{aN} \qquad \text{Eq. 3}$$

The voltage $V_{XN}$ (subscript 'X' represents phase a, b or c) in equation 3 between the AFE inverter terminal X and a negative rail of the DC bus is estimated by examining the inverter power switch collector to emitter voltages.

However, the line-to-line voltages $V_{ab}$ and $V_{ca}$ are just one example of line-to-line voltages, and the inverter termination voltage estimating module 112 may calculate other line-to-line voltages between various terminals of the AFE inverter 500.

In operation S112-4, the inverter termination voltage estimating module 112 may calculate the line-to-neutral voltage Van, Vbn and Vcn using the following equations:

$$V_{an} = \frac{1}{3}(V_{ab} - V_{ca})$$ Eq. 4

$$V_{bn} = -\frac{1}{3}(2V_{ab} + V_{ca})$$

$$V_{cn} = \frac{1}{3}(V_{ab} + 2V_{ca})$$

Therefore, the inverter voltage vector angle $\theta_i$ can be estimated in operation S114 using the line-to-neutral voltage $V_{an}$, $V_{bn}$ and $V_{cn}$. Therefore, in one or more example embodiments, the system 1000 can detect the inverter terminal voltages $V_{an}$, $V_{bn}$ and $V_{cn}$ without using physical voltage sensors at the terminals of the AC grid 400.

Figure 7:
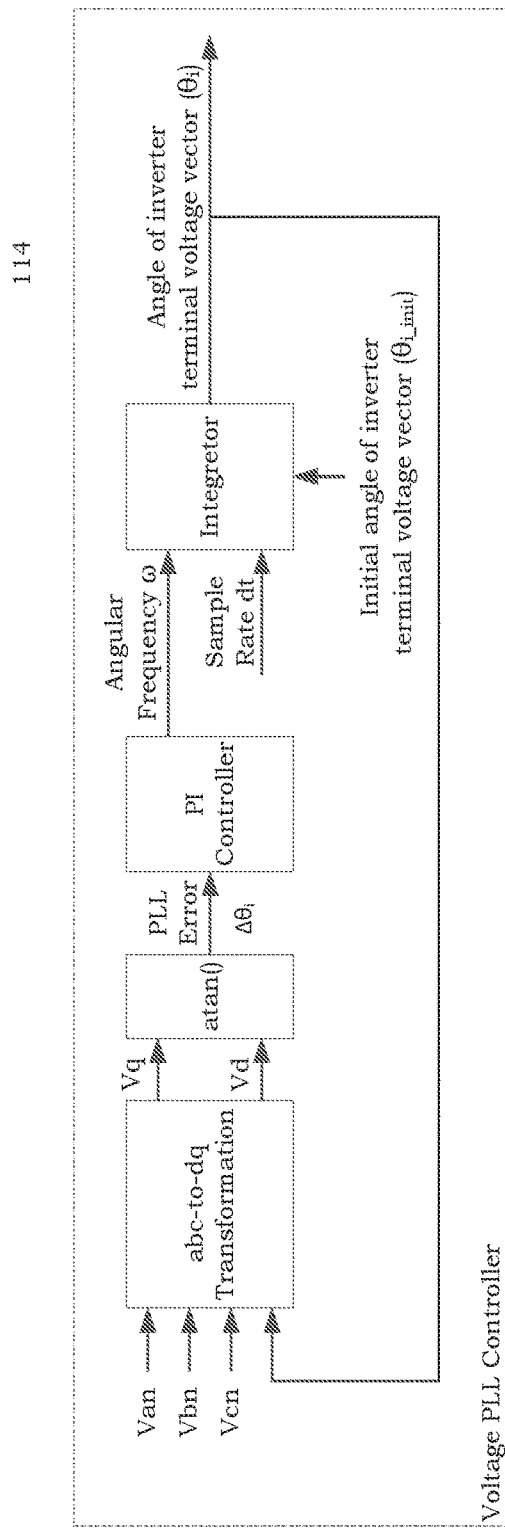
FIG. 7 illustrates a block diagram of an inverter terminal voltage vector angle detecting module included in a voltage sensorless position detecting module according to some example embodiments.
Figure 8:
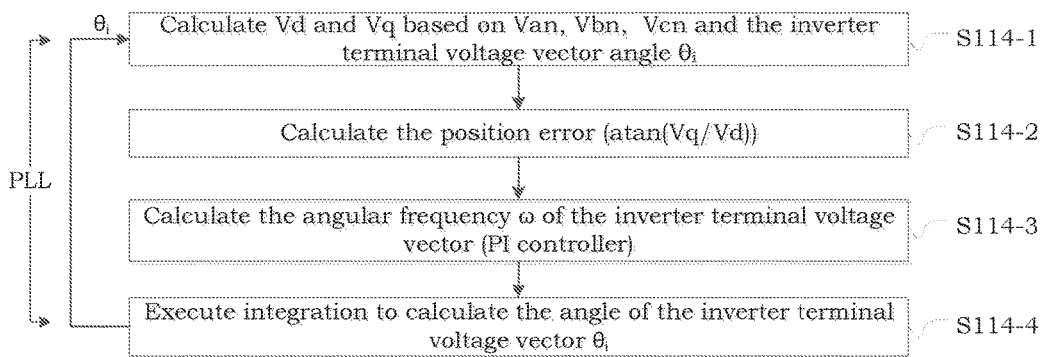
FIG. 8 illustrates a method of estimating the inverter terminal voltage vector angle according to some example embodiments.

FIG. 7 illustrates a block diagram of an inverter terminal voltage vector angle detecting module 114 and FIG. 8 illustrates a method of estimating the inverter terminal voltage vector angle according to some example embodiments.

Referring to FIGS. 1 to 5, 7 and 8, in operation S114-1, the inverter terminal voltage vector angle detecting module 114 may calculate the d-axis voltage $V_d$ and the q-axis voltage $V_q$ in the rotating dq reference frame based on the inverter terminal line-to-neutral voltage $V_{an}$, $V_{bn}$, $V_{cn}$ and the inverter terminal voltage vector angle $\theta_i$ using the Park transformation in the following equation:

$$V_\alpha = \frac{2}{3}V_{an} - \frac{1}{3}(V_{bn} - V_{cn})$$ Eq. 5

$$V_\beta = \frac{2}{\sqrt{3}}(V_{bn} - V_{cn})$$

$$V_d = V_\alpha \cdot \cos(\theta_i) + V_\beta \cdot \sin(\theta_i)$$

$$V_q = V_\beta \cdot \cos(\theta_i) - V_\alpha \cdot \sin(\theta_i)$$

In operation S114-2, the inverter terminal voltage vector angle detecting module 114 may calculate a position error $\Delta\theta_i$. The inverter terminal voltage vector angle detecting module 114 may calculate the position error $\Delta\theta_i$ using the following Equation:

$$\Delta\theta_i = \operatorname{atan}\left(\frac{V_q}{V_d}\right)$$ Eq. 6

In operation S114-3, the inverter terminal voltage vector angle detecting module 114 calculate the phase angular frequency $\omega$ based on the position error $\Delta\theta_i$.

For example, the inverter terminal voltage vector angle detecting module 114 may use a PI controller to regulate the position error $\Delta\theta_i$ to force the q-axis voltage $V_q$ to 0, which means the d-axis in the rotating dq reference frame will be forced to align to the grid voltage vector, so the output of the PI controller is the grid voltage vector angular frequency $\omega$.

In operation S114-4, the inverter terminal voltage vector angle detecting module 114 may utilize the following equation to calculate the angle $\theta_i$ of the inverter voltage vector $u_s$:

$$\theta_i = \int_0^t \omega \cdot dt + \theta_{i\_init}$$ Eq. 7

Thereafter, the inverter terminal voltage vector angle detecting module 114 may return to operation S114-1, and recalculate the d-axis voltage $V_d$ and the q-axis voltage $V_q$ such that operations S114-1 to S114-4 are performed iteratively in a phase locked loop (PLL) to reach a convergence.

Operations S114-1 to S114-4 are illustrated in FIG. 7 in block diagram form.

Figure 9:
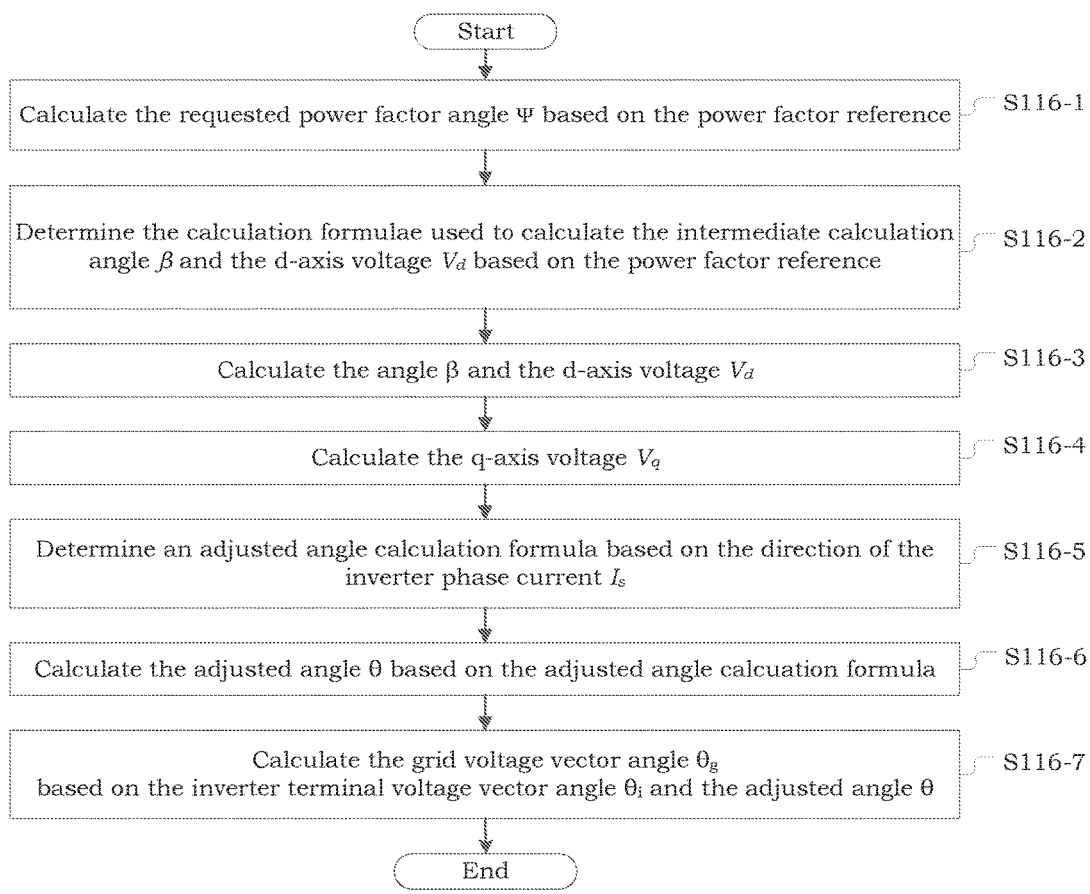
FIG. 9 illustrates a method of estimating the grid voltage vector angle according to some example embodiments.

FIG. 9 illustrates a method of estimating the grid voltage vector angle $\theta_g$ according to some example embodiments.

FIGS. 11A to 11C are vector diagrams illustrating current and voltage vectors in the dq rotating reference frame according to some example embodiments.

Referring to FIGS. 11A to 11C, in FIGS. 11A to 11C, $\Delta v$ is a voltage vector difference between an inverter terminal voltage vector $u_s$ at a terminal of the AFE inverter 500, and the grid voltage vector $u_g$ at a terminal of the AC grid 400, i.e., $\Delta v = u_s - u_g$. The angle $\beta$ is an angle between a q-axis voltage vector $V_q$ and the voltage vector difference $\Delta v'$, the angle $\alpha$ is an angle between a d-axis voltage vector $V_d$ and a vector $j\omega L i_s$. In FIGS. 11A to 11C, the angles $\alpha$ and $\beta$ are used as intermediate calculation angles to calculate an adjusted angle $\theta$ representing the difference between $\theta_i$ and $\theta_g$, and the angle $\psi$ is a power factor angle. The angles $\Psi$, $\beta$ and $\alpha$ are defined as below:

$$\psi = \cos^{-1}(|PF^*|)$$ Eq. 8

$$\alpha = \frac{\pi}{2} - \psi$$

$$0 <= \beta <= \frac{\pi}{2}$$

Since $0 <= |PF^*| <= 1$, $$0 = <\psi <= \frac{\pi}{2}$$ Eq. 9

In FIG. 11A, since the absolute value of the reference power factor PF is 1, the AFE inverter 500 supplies/consumes power to/from the AC grid 400 at a unity reference power factor PF*. In graph A1, the AFE inverter 500 supplies power to the AC grid 400. In graph A2, the AFE inverter 500 consumes power from the AC grid 400. In both cases, the power factor angle $\psi$ equals 0 (Is >0 and Is<0) and the angle $\alpha$ is:

$$\alpha = \frac{\pi}{2} - \psi = \frac{\pi}{2} - 0 = \frac{\pi}{2}$$ Eq. 10

In the following equations, R and L are the resistance and inductance values of the LR line filter 300, respectively; $I_s$ is the signed magnitude of an AFE inverter phase current reference vector $i_s$.

$$I_s = \begin{cases} \operatorname{sign}(I_d^*) \cdot \sqrt{(I_d^*)^2 + (I_q^*)^2}, & \text{when } I_d^* \neq 0 \\ -\operatorname{sign}(I_q^*) \cdot \sqrt{(I_d^*)^2 + (I_q^*)^2}, & \text{when } I_d^* = 0 \end{cases}$$ Eq. 11 where $I_d^*$ is the d-axis current reference generated from the PI controller 130 and $I_q^*$ is the q-axis current reference generated from the reactive power control module 140.

From graph A1, when ($I_s>0$ & $|PF^*|=1$), $\beta$, $V_d$ and $V_q$ can be calculated using the following equations:

$$\beta = \tan^{-1}(R/\omega L)$$

$$V_d = u_g + I_s \cdot R = u_g + \Delta v \cdot \sin(\beta) = u_g + \sin(\beta) \cdot I_s \cdot \sqrt{R^2 + (\omega \cdot L)^2}$$

$$V_q = \omega \cdot L \cdot I_s = \Delta v \cdot \cos(\beta) = \cos(\beta) \cdot I_s \cdot \sqrt{R^2 + (\omega \cdot L)^2} \quad \text{Eq. 12}$$

From graph A2, when ($I_s<0$ & $|PF^*|=1$), $\beta$, $V_d$ and $V_q$ can be calculated using the following equations:

$$\beta = \tan^{-1}(R/\omega L)$$

$$V_d = u_g + |I_s| \cdot R = u_g - \Delta v \cdot \sin(\beta) = u_g - \sin(\beta) \cdot |I_s| \cdot \sqrt{R^2 + (\omega \cdot L)^2} = u_g + \sin(\beta) \cdot I_s \cdot \sqrt{R^2 + (\omega \cdot L)^2}$$

$$V_q = -\omega \cdot L \cdot |I_s| = -\Delta v \cdot \cos(\beta) = -\cos(\beta) \cdot |I_s| \cdot \sqrt{R^2 + (\omega \cdot L)^2} = \cos(\beta) \cdot I_s \cdot \sqrt{R^2 + (\omega \cdot L)^2} \quad \text{Eq. 13}$$

In FIG. 11B, the AFE inverter 500 supplies power to the AC grid 400 at a non-unity reference power factor PF*. In graph B1, the reference power factor PF* is greater than 0, and the inverter current vector $i_s$ leads the grid voltage vector $u_g$. In graph B2, the reference power factor PF* is less than 0, and the grid voltage vector $u_g$ leads the inverter current vector $i_s$.

From graph B1, when ($I_s>0$ & PF*>0), $\beta$, $V_d$ and $V_q$ can be calculated using the following equations:

$$\beta = (\pi/2 - \alpha) - \tan^{-1}(R/\omega L) = \psi - \tan^{-1}(R/\omega L)$$

$$V_d = u_g - \Delta v \cdot \sin(\beta) = u_g - \sin(\beta) \cdot I_s \cdot \sqrt{R^2 + (\omega \cdot L)^2}$$

$$V_q = \Delta v \cdot \cos(\beta) = \cos(\beta) \cdot I_s \cdot \sqrt{R^2 + (\omega \cdot L)^2} \quad \text{Eq. 14}$$

From graph B2, when ($I_s>0$ & PF*<0), $\beta$, $V_d$ and $V_q$ can be calculated using the following equations:

$$\beta = (\pi/2 - \alpha) + \tan^{-1}(R/\omega L) = \psi + \tan^{-1}(R/\omega L)$$

$$V_d = u_g + \Delta v \cdot \sin(\beta) = u_g + \sin(\beta) \cdot I_s \cdot \sqrt{R^2 + (\omega \cdot L)^2}$$

$$V_Q = \Delta v \cdot \cos(\beta) = \cos(\beta) \cdot I_s \cdot \sqrt{R^2 + (\omega \cdot L)^2} \quad \text{Eq. 15}$$

In FIG. 11C, the AFE inverter 500 consumes power from the AC grid 400 at a non-unity reference power factor PF*. In graph C1, the reference power factor PF* is greater than 0, and the reversed inverter current vector $i_s$ leads the grid voltage vector $u_g$. In graph C2, the reference power factor PF* is less than 0, and the grid voltage vector $u_g$ leads the reversed inverter current vector $i_s$.

From graph C1, when ($I_s<0$ & PF*>0), $V_d$ and $V_q$ can be calculated using the following equations:

$$\beta = (\pi/2 - \alpha) - \tan^{-1}(R/\omega L) = \psi - \tan^{-1}(R/\omega L)$$

$$V_d = u_g + \Delta v \cdot \sin(\beta) = u_g + \sin(\beta) \cdot |I_s| \cdot \sqrt{R^2 + (\omega \cdot L)^2} = u_g - \sin(\beta) \cdot I_s \cdot \sqrt{R^2 + (\omega \cdot L)^2}$$

$$V_q = -\Delta v \cdot \cos(\beta) = -\cos(\beta) \cdot |I_s| \cdot \sqrt{R^2 + (\omega \cdot L)^2} = \cos(\beta) \cdot I_s \cdot \sqrt{R^2 + (\omega \cdot L)^2} \quad \text{Eq. 16}$$

From graph C2, when ($I_s<0$ & PF*<0), $V_d$ and $V_q$ can be calculated using the following equations:

$$\beta = (\pi/2 - \alpha) + \tan^{-1}(R/\omega L) = \psi + \tan^{-1}(R/\omega L)$$

$$V_d = u_g - \Delta v \cdot \sin(\beta) = u_g - \sin(\beta) \cdot |I_s| \cdot \sqrt{R^2 + (\omega \cdot L)^2} = u_g + \sin(\beta) \cdot I_s \cdot \sqrt{R^2 + (\omega \cdot L)^2}$$

$$V_q = -\Delta v \cdot \cos(\beta) = -\cos(\beta) \cdot |I_s| \cdot \sqrt{R^2 + (\omega \cdot L)^2} = \cos(\beta) \cdot I_s \cdot \sqrt{R^2 + (\omega \cdot L)^2} \quad \text{Eq. 17}$$

As discussed in more detail below with reference to FIG. 9, based on analysis above for all cases in FIGS. 11A to 11C, the grid voltage vector angle estimating module 116 may select different ones of the following equations to calculate the adjusted angle θ from the AFE inverter 500 terminal to the AC grid 400 terminal:

$$\psi = \cos^{-1}(|PF^*|) \quad \text{Eq. 18}$$

$$\begin{cases} \beta = \psi - \tan^{-1}(R/\omega L), & \text{when } 1 > PF^* >= 0 \\ \beta = \psi + \tan^{-1}(R/\omega L), & \text{when } |PF^*| = 1 \text{ or } PF^* < 0 \end{cases}$$

$$\begin{cases} V_d = u_g - \sin(\beta) \times I_S \times \sqrt{R^2 + (\omega L)^2}, & \text{when } 1 > PF^* >= 0 \\ V_d = u_g + \sin(\beta) \times I_S \times \sqrt{R^2 + (\omega L)^2}, & \text{when } |PF^*| = 1 \text{ or } PF^* < 0 \end{cases}$$

$$V_q = \cos(\beta) \times |I_S| \times \sqrt{R^2 + (\omega L)^2}$$

$$\begin{cases} \theta = -\tan^{-1}\left(\frac{V_q}{V_d}\right), & \text{when } I_S >= 0 \\ \theta = \tan^{-1}\left(\frac{V_q}{V_d}\right), & \text{when } I_S < 0 \end{cases}$$

Therefore, the compensated position considering phase shift between the inverter terminal voltage vector angle $\theta_i$ and the grid voltage vector angle $\theta_g$ can be calculated using the following equation:

$$\theta_g = \theta_i + \theta \quad \text{Eq. 19}$$

Referring to FIGS. 1 to 5, 9 and 11A to 11C, using various ones of Equations 18 and 19, discussed above, the grid voltage vector angle estimating module 116 may calculate the grid voltage vector angle $\theta_g$.

In operation S116-1, the grid voltage vector angle estimating module 116 may calculate the requested power factor angle Ψ based on the reference power factor PF* using the following Equation:

$$\Psi = \cos^{-1}(|PF^*|). \quad \text{Eq. 20}$$

In operation S116-2, the grid voltage vector angle estimating module 116 may determine whether the absolute value of the reference power factor PF* is equal to 1 or whether the reference power factor PF* is less than zero, and the grid voltage vector angle estimating module 116 will use this information about the reference power factor PF* to determine which of the equations included in Equation 18 will be used to calculate the intermediate calculation angle β and the d-axis voltage $V_d$.

In operation S116-3, the grid voltage vector angle estimating module 116 may calculate the intermediate calculation angle β based on the power factor angle Ψ determined in operation S116-1, the grid voltage vector angular frequency ω calculated in operation S114, and known line filter parameters L and R, which are the inductance and resistance values of the LR line filter 300, respectively. Further, the grid voltage vector angle estimating module 116 may calculate the d-axis voltage $V_d$ based on the intermediate calculation angle β, the line filter parameters R and L, the grid voltage vector angular frequency ω calculated in operation S114, the signed magnitude of the AFE inverter phase current vector reference $i_s$, and a magnitude of the grid voltage vector $u_g$.

The grid voltage vector angle estimating module 116 may calculate the angle β and d-axis voltage $V_d$ using different ones of the equations included in Equation 18 based on the reference power factor PF*.

For example, if the absolute value of the reference power factor PF* is equal to 1 or the reference power factor is less than zero, the grid voltage vector angle estimating module 116 may determine the angle β and $V_d$ using the following equations:

$$\beta = \psi + \tan^{-1}(R/\omega L)$$

$$V_d = u_g + \sin(\beta) \times I_s \times \sqrt{R^2 + (\omega L)^2} \quad \text{Eq. 20}$$

Alternatively, if the absolute value of the reference power factor PF* is not equal to 1 or the reference power factor PF* is greater than or equal to zero, the grid voltage vector angle estimating module 116 may determine the angle β and $V_d$ using the following two equations:

$$\beta = \psi - \tan^{-1}(R/\omega L)$$

$$V_d = u_g - \sin(\beta) \times I_s \times \sqrt{R^2 + (\omega L)^2} \quad \text{Eq. 21}$$

In operation S116-4, the grid voltage vector angle estimating module 116 may calculate the q-axis voltage $V_q$ based on the angle β determined in operation S116-3, the line filter parameters L and R, the grid voltage vector angular frequency ω calculated in operation S114, and the magnitude of the AFE inverter phase current vector reference $I_s$. For example, the grid voltage vector angle estimating module may calculate $V_q$ using the following Equation:

$$V_q = \cos(\beta) \times |I_s| \times \sqrt{R^2 + (\omega L)^2} \quad \text{Eq. 22}$$

In operation S116-5, the grid voltage vector angle estimating module 116 may determine whether the signed magnitude of the inverter phase current vector $I_s$ is positive or negative, and the grid voltage vector angle estimating module 116 may determine which of the equations in Equation 18 to use to calculate the adjusted angle θ based on the signed magnitude of the inverter phase current vector $I_s$.

In operation S116-6, the grid voltage vector angle estimating module 116 may calculate the adjusted angle θ based on the equation determined in operation S116-5, such that different ones of the equations included in Equation 18 are utilized to determine the adjusted angle θ based on the signed magnitude of the inverter phase current vector $I_s$ In operation S116-7, the grid voltage vector angle estimating module 116 may calculate the grid voltage vector angle $\theta_g$ based on the adjusted angle θ determined in operation S116-6 and the inverter terminal voltage vector angle $\theta_i$ determined in operation S114.

Figure 10:
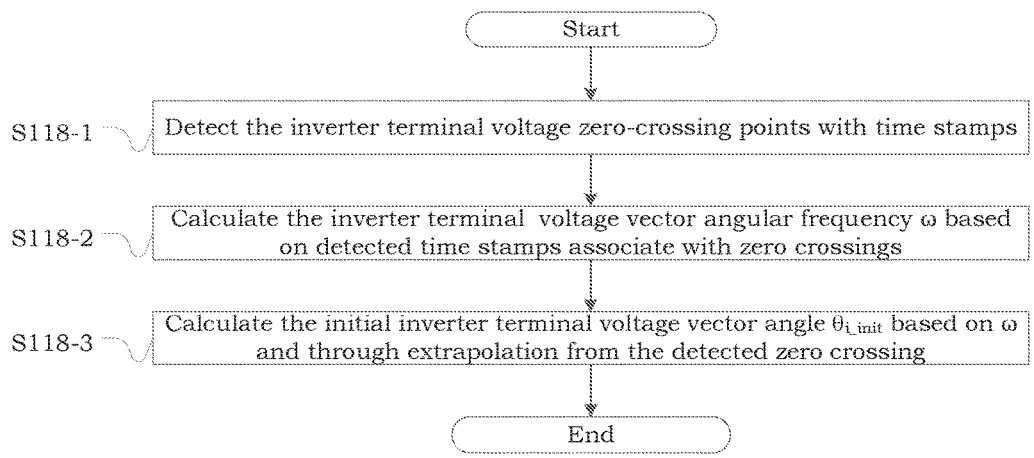
FIG. 10 illustrates a method of generating an initial terminal voltage vector angle according to some example embodiments.

FIG. 10 illustrates a method of generating an initial inverter terminal voltage vector angle according to some example embodiments.

Referring to FIGS. 1 to 5 and 10, in operation S118-1, the initial inverter terminal voltage vector angle detecting module 118 may detect the inverter terminal voltage zero-crossing instants and record the time stamps when the AFE inverter 500 is disabled. For example, a hardware device, such as a PSoC chip, can be utilized to detect the zero-crossing instants of the inverter terminal voltage $u_s$.

Based on the recorded time stamps information at each zero-crossing instant, the initial inverter terminal voltage vector angle detecting module 118 may estimate the angle $\theta_i$ of the inverter terminal voltage vector $u_s$ before the AFE inverter 500 is enabled, and use the estimated angle $\theta_i$ of the inverter terminal voltage vector $u_s$ to initialize the PLL controller.

In operation S118-2, the initial terminal voltage angle detecting module 118 may calculate the inverter terminal voltage angular frequency ω based on the inverter terminal voltage zero-crossing instants before the AFE inverter 500 is enabled. For example, the initial terminal voltage vector angle detecting module 118 may calculate the inverter terminal voltage angular frequency ω in rad/sec using the following Equation:

$$\omega = \pi / \Delta t, \quad \text{Eq. 23}$$

where Δt is the time stamp difference in seconds between two zero-crossing instants.

In operation S118-3, the initial terminal voltage vector angle detecting module 118 may calculate the initial inverter terminal voltage vector angle $\theta_{i\_init}$ based on the inverter terminal voltage angular frequency ω. For example, the initial inverter terminal voltage vector angle detecting module 118 may calculate the initial inverter terminal voltage vector angle $\theta_{i\_init}$ using the following Equation:

$$\theta_{i\_init} = \int_0^t \omega \cdot dt + \theta_{zero\_crossing} \quad \text{Eq. 24}$$

where $\theta_{i\_init}$ is the calculated initial inverter terminal voltage vector angle and $\theta_{zero\_crossing}$ is the inverter terminal voltage vector angle corresponding to the most recent zero-crossing instant.

The initial terminal voltage vector angle detecting module 118 may provide the initial inverter terminal voltage vector angle $\theta_{i\_init}$ to the inverter terminal voltage vector angle detecting module 114. As discussed above, the inverter terminal voltage vector angle detecting module 114 may use the initial inverter terminal voltage vector angle $\theta_{i\_init}$ to initialize the integrator of the PLL controller in the inverter terminal voltage vector angle detecting module 114. Therefore, the PLL controller may start with the correct initial inverter terminal voltage vector angle $\theta_{i\_init}$ without using the bulkiness of sensors at the AC grid terminal 400.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A controller comprising:
   a memory having computer-readable instructions stored therein; and
   a processor configured to execute the computer-readable instructions to,
   estimate a synthesized grid voltage vector angle at a terminal of an alternating current (AC) grid without using physical voltage sensors at the terminal of the AC grid by,
   estimating a terminal voltage of an Active Front End (AFE) inverter when the AFE inverter is enabled, the terminal voltage of the AFE inverter being a voltage of a terminal of the AFE inverter,
   estimating a first AFE inverter terminal voltage vector angle when the AFE inverter is disabled, the first AFE inverter terminal voltage vector angle being an angle associated with the voltage vector of the terminal of the AFE inverter at an initial time,
   determining a second AFE inverter terminal voltage vector angle when the AFE inverter is enabled, the second AFE inverter terminal voltage vector angle being an angle associated with the voltage vector of the terminal of the AFE inverter at a second time subsequent to the initial time, and estimating the synthesized grid voltage vector angle based on the second AFE inverter terminal voltage vector angle, the synthesized grid voltage vector angle being an angle associated with a voltage vector at the terminal of the AC grid;

generate Pulse Width Modulation (PWM) signals to control power switches of the AFE inverter based on at least (i) the synthesized grid voltage vector angle at the terminal of the AC grid and (ii) a AC grid terminal reference power factor, the AC grid terminal reference power factor representing a desired phase shift between the voltage vector and a current vector at the terminal of the AC grid; and control the AFE inverter to supply power to a load based on the PWM signals.

2. The controller of claim 1, wherein the processor is configured to generate the PWM signals by, converting measured current from a measured 3-phase current in a stationary reference frame to a measured direct-quadrature (dq)-axis current in a dq rotating reference frame, generating a q-axis current reference based on the AC grid terminal reference power factor, generating a d-axis current reference based on an actual DC bus voltage and a reference DC bus voltage, the actual DC bus voltage being connected to the load, the d-axis current reference and the q-axis current reference forming a dq-axis current reference, generating dq-axis reference voltages based on the measured dq-axis current in the dq rotating reference frame and the dq-axis current reference, and generating 3-phase gate driving signals for the AFE inverter by converting the dq-axis reference voltages based on the synthesized grid voltage vector angle, the 3-phase gate driving signals being the PWM signals.

3. The controller of claim 2, wherein the processor is configured to convert the measured current from the measured 3-phase current to the measured dq-axis current based on the synthesized grid voltage vector angle.

4. The controller of claim 2, wherein the processor is configured to generate the d-axis current reference by, comparing the actual dc bus voltage and the reference DC bus voltage, and generating the d-axis current reference using a PI controller.

5. The controller of claim 2, wherein the processor is configured to generate the q-axis current reference based on the AC grid terminal reference power factor and the d-axis current reference.

6. The controller of claim 2, wherein the processor is configured to generate the dq-axis reference voltages by, generating a comparison signal based on a result of comparing the d-axis current reference and the q-axis current reference with a d-axis value of the measured dq-axis current and a q-axis value of the measured dq-axis current, respectively, and generating dq-axis reference voltages based on the comparison signal.

7. The controller of claim 2, wherein the processor is configured to, refine the synthesized grid voltage vector angle by compensating for a time delay associated with digital processing to generate a refined synthesized grid voltage vector angle, and generate the 3-phase gate driving signals for the AFE inverter based on the dq-axis reference voltages and the refined synthesized grid voltage vector angle, wherein the 3-phase gate driving signals are transmitted to the AFE inverter to switch a plurality of half bridges included in the power switches of the AFE inverter.

8. The controller of claim 1, wherein the processor is configured to generate the PWM signals such that the AFE inverter maintains an actual DC bus voltage connected to the load.

9. The controller of claim 1, wherein, if the inverter is enabled, the processor is configured to estimate the terminal voltage of the AFE inverter by, estimating 3-phase line-to-neutral voltages of the terminal of the AFE inverter based on status signals associated with power switches of the AFE inverter and corresponding voltage drops across the power switches.

10. The controller of claim 9, wherein the processor is configured to estimate the 3-phase line-to-neutral voltages by, examining collector-emitter voltages associated with each of the power switches of the AFE inverter.

11. The controller of claim 1, wherein, if the inverter is disabled, the processor is configured to estimate the first AFE inverter terminal voltage vector angle by, detecting zero-crossing instants when the voltage of the terminal of the AFE inverter crosses zero, calculating a AFE inverter terminal voltage vector angular frequency based on the zero-crossing instants, the AFE inverter terminal voltage vector angular frequency being an angular frequency in rad/sec of the voltage of the terminal of the AFE inverter, and calculating the first AFE inverter terminal voltage vector angle based on the AFE inverter terminal voltage vector angular frequency and a position of an AFE inverter terminal voltage vector corresponding to a most recent one of the zero-crossing instants.

12. The controller of claim 1, wherein the processor is configured to estimate the second AFE inverter terminal voltage vector angle by, initializing a phase locking loop (PLL) using the first AFE inverter terminal voltage vector angle when the inverter is disabled, and running the phase locking loop (PLL) using 3-phase line-to-neutral voltages of the terminal of the AFE inverter when the inverter is enabled.

13. The controller of claim 12, wherein the processor is configured to estimate the second AFE inverter terminal voltage vector angle by running the PLL to align the second AFE inverter terminal voltage vector angle with a d-axis of a dq rotating reference frame.

14. The controller of claim 13, wherein, when the AFE inverter is enabled, the processor is configured to estimate the second AFE inverter terminal voltage vector angle by running the PLL to continually, calculate a position error between the second AFE inverter terminal voltage vector angle and the d-axis, calculate an angular frequency of the second AFE inverter terminal voltage vector angle by using a PI controller to regulate the position error, and calculate the second AFE inverter terminal voltage vector angle by integrating the angular frequency.

15. The controller of claim 1, wherein the processor is configured to estimate the AC grid voltage vector angle by compensating for an actual phase shift due to a voltage drop across a filter between the terminal of the AFE inverter and the terminal of the AC grid.

16. The controller of claim 15, wherein the filter is one of a LCL line filter and a LR line filter.

17. A method of generating Pulse Width Modulation (PWM) signals for power switches of an Active Front End (AFE) inverter, the method comprising:
  estimating a synthesized grid voltage vector angle at a terminal of an alternating current (AC) grid without using physical voltage sensors at the terminal of the AC grid by,
    estimating a terminal voltage of the AFE inverter when the AFE inverter is enabled, the terminal voltage of the AFE inverter being a voltage of a terminal of the AFE inverter,
    estimating a first AFE inverter terminal voltage vector angle when the AFE inverter is disabled, the first AFE inverter terminal voltage vector angle being an angle associated with the voltage vector of the terminal of the AFE inverter at an initial time,
    determining a second AFE inverter terminal voltage vector angle when the AFE inverter is enabled, the second AFE inverter terminal voltage vector angle being an angle associated with the voltage vector of the terminal of the AFE inverter at a second time subsequent to the initial time, and
    estimating the synthesized grid voltage vector angle based on the second AFE inverter terminal voltage vector angle, the synthesized grid voltage vector angle being an angle associated with a voltage vector at the terminal of the AC grid;
  generating the PWM signals to control the power switches of the AFE inverter based on at least (i) the synthesized grid voltage vector angle at the terminal of the AC grid and (ii) a AC grid terminal reference power factor, the AC grid terminal reference power factor representing a desired phase shift between the voltage vector and a current vector at the terminal of the AC grid; and
  controlling the AFE inverter to supply power to a load based on the PWM signals.

18. The method of claim 17, wherein the generating the PWM signals comprises:
  converting measured current from a measured 3-phase current in a stationary reference frame to a measured direct-quadrature (dq)-axis current in a dq rotating reference frame;
  generating a q-axis current reference based on the AC grid terminal reference power factor,
  generating a d-axis current reference based on an actual DC bus voltage and a reference DC bus voltage, the actual DC bus voltage being connected to the load, the d-axis current reference and the q-axis current reference forming a dq-axis current reference;
  generating dq-axis reference voltages based on the measured dq-axis current in the dq rotating reference frame and the dq-axis current reference; and
  generating 3-phase gate driving signals for the AFE inverter by converting the dq-axis reference voltages based on the synthesized grid voltage vector angle, the 3-phase gate driving signals being the PWM signals.

19. The method of claim 17, wherein the generating the PWM signals generates the PWM signals such that the AFE inverter maintains an actual DC bus voltage connected to the load.

20. A controller comprising:
  a memory having computer-readable instructions stored therein; and
  a processor configured to execute the computer-readable instructions to,
    estimate a synthesized grid voltage vector angle at a terminal of an alternating current (AC) grid without using physical voltage sensors at the terminal of the AC grid;
    generate Pulse Width Modulation (PWM) signals to control power switches of an Active Front End (AFE) inverter based on at least (i) the synthesized grid voltage vector angle at the terminal of the AC grid and (ii) a AC grid terminal reference power factor without using physical voltage sensors at the terminal of the AC grid, the AC grid terminal reference power factor representing a desired phase shift between a voltage vector and a current vector at the terminal of the AC grid, wherein the controller is configured to generate the PWM signals by,
      converting measured current from a measured 3-phase current in a stationary reference frame to a measured direct-quadrature (dq)-axis current in a dq rotating reference frame,
      generating a q-axis current reference based on the AC grid terminal reference power factor,
      generating a d-axis current reference based on an actual DC bus voltage and a reference DC bus voltage, the actual DC bus voltage being connected to a load, the d-axis current reference and the q-axis current reference forming a dq-axis current reference,
      generating dq-axis reference voltages based on the measured dq-axis current in the dq rotating reference frame and the dq-axis current reference, and
      generating 3-phase gate driving signals for the AFE inverter by converting the dq-axis reference voltages based on the synthesized grid voltage vector angle, the 3-phase gate driving signals being the PWM signals; and
    control the AFE inverter to supply power to the load based on the PWM signals.

\* \* \* \* \*